United States Patent [19]
> Hattori et al.

[11] 4,099,205
[45] Jul. 4, 1978

[54] PHASE CONTROL SYSTEM

[75] Inventors: Hajime Hattori, Ichinomiya; Eiji Usui; Takashi Oya, both of Nagoya; Kaneyoshi Sugawa, Kawasaki; Eiji Kezuka, Yokohama; Tadashi Okada, Yokohama; Toshiro Watanabe, Yokohama, all of Japan

[73] Assignees: Chubu-Nippon Broadcasting Co., Ltd., Nagoya; Matsushita Electric Industrial Co., Ltd., Osaka, both of Japan

[21] Appl. No.: 735,134

[22] Filed: Oct. 26, 1976

[30] Foreign Application Priority Data

Oct. 27, 1976 [JP] Japan .................... 50-129728

[51] Int. Cl.² ........................................... H04N 5/04
[52] U.S. Cl. ............................................. 358/149
[58] Field of Search ................................. 358/149

[56] References Cited
U.S. PATENT DOCUMENTS 4,018,990  4/1977  Long et al. .................... 358/149

Primary Examiner—Robert L. Richardson
Attorney, Agent, or Firm—Stevens, Davis, Miller & Mosher

[57] ABSTRACT

A television signal is encoded by the use of a sampling pulse synchronized with a color subcarrier frequency included in an input television signal, the encoded signal is compressed and recorded in a memory for later reproduction of a desired compressed picture image having a desired size and center position, the recorded signal is reproduced under the control of a clock pulse signal produced in synchronism with a sync signal obtained in a studio, for example, and the reproduced signal is corrected by inverting the polarity of the chroma component according to frame information at the time of recording of said reproduced signal.

Thus, it is possible to freely obtain phase coupling of different synchronizing signals; for instance, it is possible to bring the phase of a different television signal of a different synchronization system into coincidence with the phase of a central synchronization signal and it is possible to reproduce an object image optionally compressed on a TV display screen.

9 Claims, 10 Drawing Figures

FIG. 2
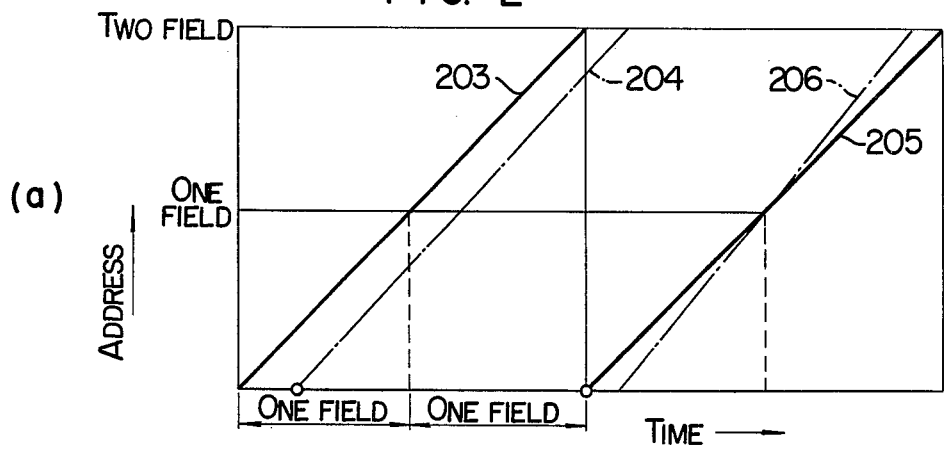
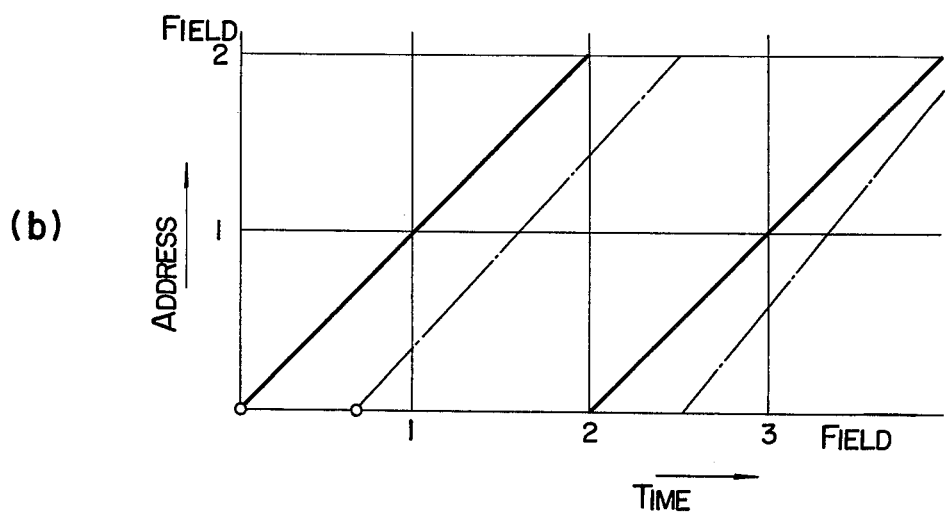
FIG. 3
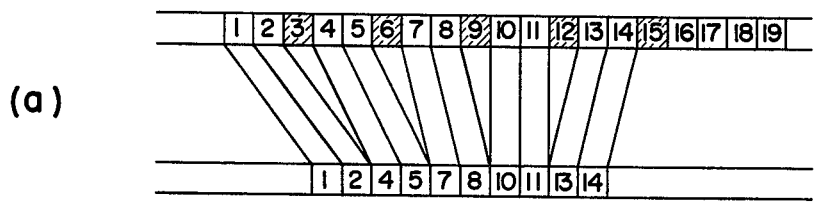
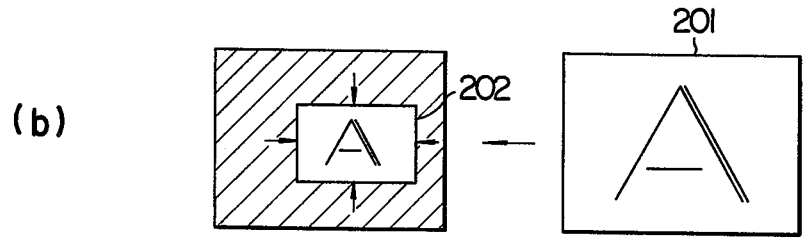

PHASE CONTROL SYSTEM

This invention relates to a phase control means, more particularly to a phase control means for bringing the phase of a TV signal of one synchronization system into coincidence with the phase of a TV signal of another separate synchronization system. In conventional multi-station television broadcasting in which television signals from local stations in various areas of the country or through external relay lines are gathered in a central studio into a program, the so-called external input video signals are based on respectively independent original oscillation frequencies of a sync signal generator. Also, the delay times through relay lines vary for each station or base. Further, in a case where part of the reproduced picture frame is selectively replaced by a reproduced image of a different input video signal by imparting a special effect, it often happens that an important portion of said input video signal lacks depending upon the selected position of insertion. To avoid this, it is necessary to achieve synchronization coupling with the input video signal, and to transmit detailed specifications for the image construction to the site where the input video is produced. Alternatively, resort has been had to means of displaying the input video signal on a picture tube and absorbing the sync frequency and phase differences of the input video signal by means of picking up the picture again while at the same time varying the image display size and position of the input video signal to thereby produce a new video signal. With both these methods, instantaneous information about the image size and position has to be transmitted to the site of input video signal production, and this involves considerable difficulties. In addition, it is necessary to always provide continuous state of synchronization coupling by some means or another. Further, in the latter case the picture quality is deteriorated due to re-picturing, and there is a problem that unstable elements are likely to be introduced since the method is not purely electronic.

The invention has for its object the provision of a system for bringing television signals of different synchronization systems into coincidence with the phase of a central synchronizing signal when television signals produced from independent sync signal generators provided in various places are gathered in a single place to produce a program.

Another object of the invention is to provide a totally electronic means for varying the display size and position of input video signals so as to facilitate production of a program including effects peculiar to multi-station broadcasting. These and other objects, features and advantages of the invention will be apparent from the following description taken in conjunction with the accompanying drawings, in which:

FIGS. 2a, 2b, 4a, 4b, 4c and 4d show access states of recording and reproduction of television signal.

FIGS. 3a and 3b show principles underlying image compression.

Figure 1:
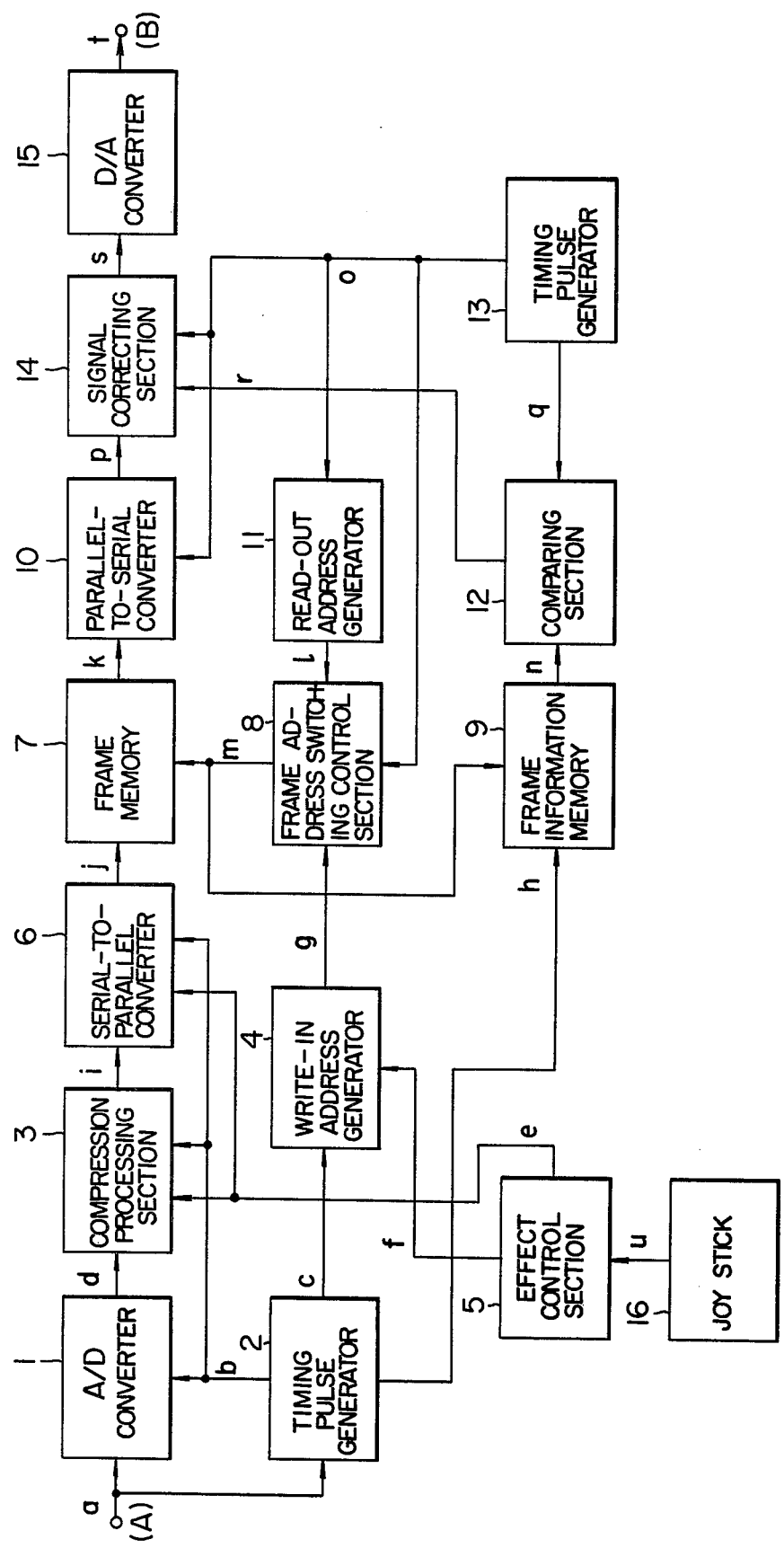
FIG. 1 is a block diagram showing an embodiment of the phase control system according to the invention.

A phase control system according to the invention will now be described. FIG. 1 shows the phase control system. In this system, a first clock pulse signal is produced from a timing pulse generator 2 under the control of the horizontal sync. signal, vertical sync. signal and color burst contained in a video signal (a) of a first synchronization apparatus appearing at a terminal A.

The video signal (a) is encoded in an A/D converter 1 under the control of the clock pulse signal (b), and the resultant encoded data (d) is supplied to a compression processing section 3 and is separated into luminance component and chroma component by a digital filter contained in the compression processing section 3. The A/D converter 1 is operated, for instance, at a sampling frequency of about 10.7 MHz (i.e., three times the NTSC color subcarrier frequency), and one sampling consists of 8 bits. The digital filter contained in the compression processing section 3 may be a modification in digital construction of a comb type filter popularly used as an analog means, or may be a device, in which correlated chroma components are taken out from adjacent encoded data and processed through parallel operation. These structures are well known in the art.

The luminance component and chroma component data separated by the digital filter in this way are subjected to a treatment of some portions from a continuous data group for rearranging the extracted data under the control of information (e) supplied from an effect control section 5 which is controlled by a joy-stick 16 in order to obtain a video signal of a desired size.

Figure 6:
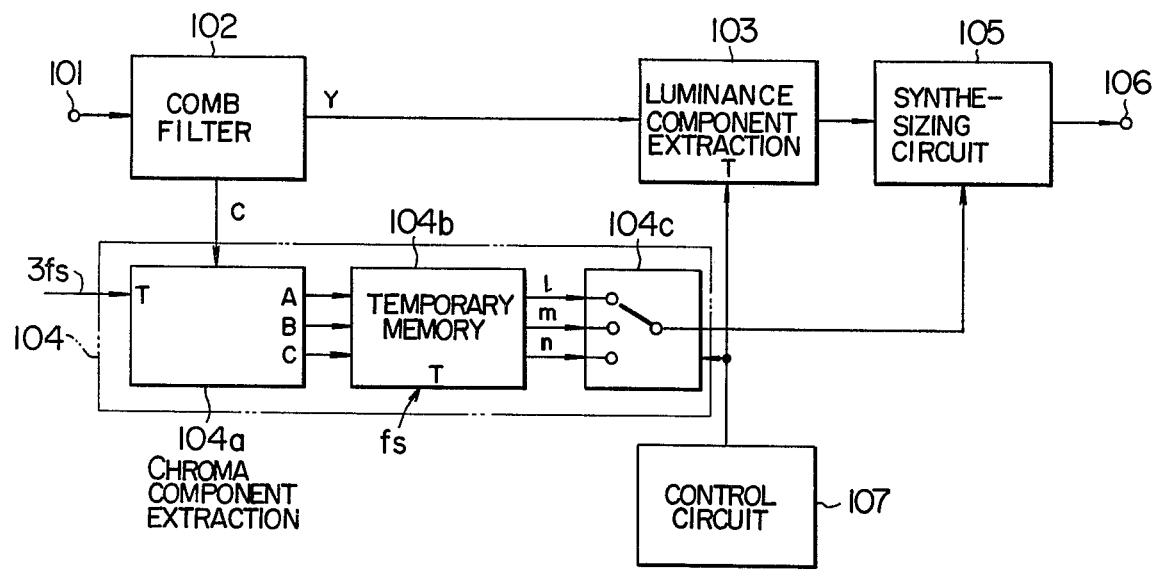
FIG. 6 is a schematic representation of a detailed circuit construction of part of the embodiment.

The construction of this compression processing section 3 is covered in an invention, which has already been made in an application in Japan by the same applicant as Japanese Patent Application No. 118483/1975 and also in an application Ser. No. 726,783 filed on Sept. 27, 1976 in The United States of America as entitled "CHROMA-SIGNAL PROCESSING SYSTEM", and it will now be briefly described here. FIG. 6 shows the inner construction of the compression processing section. Designated at 101 is an A/D converted video signal input terminal, at 102 a comb filter for separating a luminance component and a chroma component, at 103 a circuit for effecting a picture element extraction from a luminance component, at 104 a circuit for effecting picture element extraction of a chroma component, and at 105 a synthesizing circuit for combining the luminance component after the extraction treatment and chroma component to obtain a composite signal again. Designated at 106 is an output terminal, and at 107 a control circuit for controlling the extraction treatment.

Designated at 104a is a serial-parallel conversion circuit for subjecting the separated chroma component to parallel conversion for a picture element portion corresponding to a sampled quantity for one subcarrier portion. In the Figure, the sampling frequency is shown as three times the subcarrier frequency $f_S$. Designated at 104b is a temporary memory section for holding the parallel converted chroma component for one subcarrier period, and at 104c a parallel-series conversion circuit for eliminating discontinuities of the subcarrier wave resulting from the extracting treatment and also converting the parallel arrangement of chroma component into a series arrangement.

Figure 5:
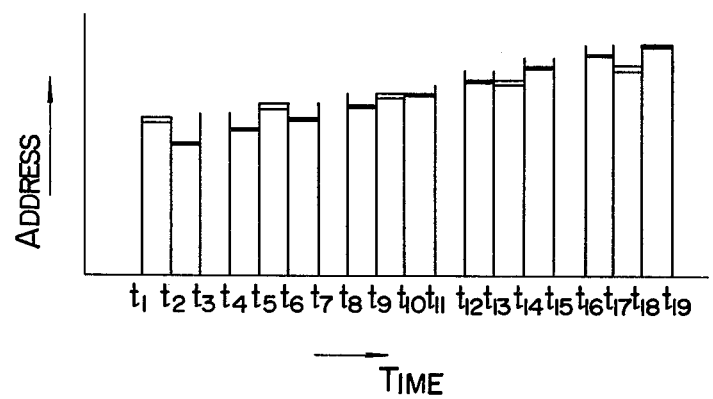
FIG. 5 is an enlarged-scale representation of a moment of crossing in the state shown in FIG. 4.

In the NTSC signal there is a great difference in the frequency region between the luminance signal and the chroma signal, and the rate of change of the luminance signal is large while that of the chroma signal is very small and may be thought constant above the subcarrier frequency cycle. Also, the phase of the subcarrier wave differs by 180° for every scanning line. From these grounds, the luminance component and chroma component may be separated, and only the chroma component may be subjected to a particular treatment. Thus, the operation of the converting circuit 104c in FIG. 5 is featured by a switch circuit for giving a compression effect while producing together with the conversion circuit 104a and temporary memory section 104b a chroma component such as to provide continuity of the subcarrier wave, that is, a switch circuit being operated for rotary operation according to extracting pulses supplied from the control circuit 107 by utilizing the fact that the chroma component does not change over at least several cycles of the subcarrier wave. A signal given from a control circuit 107 to circuit 103 and converting circuit 104 is a timing pulse signal for extracting picture elements, and in the circuit 103 a latch circuit is operated only when transmitting required picture elements. This pulse signal is also coupled to the converting circuit 104c to operate the switch circuit stepwise. The switch circuit changes its state only when a pulse is impressed upon it, thus selectively providing input signals to the converting circuit 104a in the order of l, m, n, l, m, n . . . under the control of extraction pulses. Meanwhile, a chroma signal to the converting circuit 104a is altered for every sampling pulse $3f_S$ and subjected to parallel conversion for every cycle of subcarrier wave $f_S$ before it is fed to the temporary memory section 104b. Thus, it is altered for every cycle of the subcarrier wave $f_S$ and does not change within each cycle period of the subcarrier wave.

While the circuit described above in connection with FIG. 6 serves to effect treatment of the chroma component on the basis of serial-to-parallel conversion for one cycle period of the subcarrier wave, the chroma component subjected to the serial-to-parallel conversion is not limited to one cycle period of the subcarrier wave. In case with more than one cycle period, a circuit for carrying out digital modulation again after color demodulation by making use of characters between adjacent sampling points and a circuit for averaging the rate of change of chroma between sampling points of the same phase may be provided between the temporary memory 104b and converting circuit 104c. Also, the sampling points in one subcarrier cycle period are not limited to three points, and in this case chroma component serial-to-parallel conversion and serial-to-parallel conversion circuit are influenced.

In the compression processing section 3, for compressing an image as indicated at 201 into one indicated at 202 as shown in FIG. 3b of a sequence of supplied data 1, 2, 3 . . . unnecessary data 3, 6, 9, 12 . . . are extracted, and the remaining data is compressed to complete the extraction treatment. In this case, for the luminance component it is possible to obtain continuity practically free from any problem by effecting suitable bit or line interpolation into the extracted portions. However, with the chroma component in this case the color information is disturbed because of its relation to the subcarrier wave. In the instant system, accordingly, on the basis of the fact that the chroma signal is less subject to changes with time as mentioned earlier, extraction of given data bits of both chroma component and luminance component is effected by using a special means for making continuous the subcarrier wave transmitting the chroma component.

Referring now back to FIG. 1, as the chroma component data having been subjected to extraction treatment is recorded through a serial-to-parallel converter 6 to a position predetermined in a frame memory 7 under the control of write-in address (g) for writing in frame memory 7 produced by information from an effect control section 5 at a timing generator section 5, it is treated such that the subcarrier wave component contained in the chroma component data is made continuous and that subcarrier wave phases belonging to adjacent horizontal scanning lines are 180° out of phase, and then it is combined again with the luminance component and supplied as data (i) into a serial-to-parallel converter 6. The encoded and extraction treated data (i) coupled to the serial-to-parallel converter 6 is subjected to serial-to-parallel conversion so as to meet the operating speed of a frame memory 7 for writing and reading. At the same time, it acts to compress intermittent data resulting from extraction of unnecessary portions in the compression processing section 3. The parallel converted data (i) is written in a frame memory 7 in a manner which enables reproduction of a desirable compressed image when fetched from the frame memory as determined by the output (g) of a write-in address generating section 4.

The address generating section 4 comprises an operational unit receiving information (f) transferred from an effect control section 5 and timing pulse from the timing pulse generator 2 and controlled to change its state in correspondence to data (i) started from a position specified by the effect control section 5 and treated by the compression processing section 3 to produce the write-in address signal (g). The effect control section 5 is an operational unit which processes information required for the width-to-height ratio as the video signal, compression ratio of the image and displacement of center position of the image on the basis of position data (u) transferred from the joy stick 16. The joy stick 16 is manually operated and produces horizontal and vertical position data (u), under the control of which image display is obtained.

A memory address switching control section 8 is driven by a second timing pulse signal (o) produced by a timing pulse generator 13 under the control of horizontal sync signal, vertical sync signal, or subcarrier signal controlled by a second independent synchronizing signal (i.e., synchronizing signal in a central studio) and switches address (l) from an address generator 11 which is also driven by the second timing pulse signal (o) and output (g) of the write-in address generator 4 so as to drive the frame memory 7 for controlling the reading and writing of data. The frame memory 7 has written therein output signal (j) of the serial-to-parallel converter section 6 in a manner which enables later reproduction of a desirable compressed image when readout from memory by address instructions produced from the write-in address generator 4. The readout of the output signal (j) is effected by the input signal (m) in non-synchronous relation to addressing by the address generator 4 in a readout timing period specified by the timing pulse generator 13.

The encoded data recorded in the frame memory 7 is read out as signal (k) in the order of television scanning according to a read-out address signal generated by the read-out address generator 11, and it is then subjected to parallel-to-serial conversion in a parallel-to-serial converter 10 and transferred as output signal (p) to a signal correcting section 14. Meanwhile, whether a frame to which a video signal controlled by the first synchronizing signal belongs is odd or even is determined by the timing pulse generator 2, and the resultant is transferred as signal (h) to a frame information memory section 9, which is driven by output signal (m) of the memory address switching control section 8, for recording and reproduction in correspondence to the address of the frame memory 7. The output signal (n) of the frame information memory 9 is compared in a comparing section 12 with a signal (q) produced from the timing pulse generator 13 and representing whether a frame to which the reproduction side synchronizing signal belongs is odd or even. Alternatively, comparison can be made between the address of the encoded signal recorded into the frame memory 7 with an address of the encoded signal readout from the frame memory.

In the signal correcting section 14 the encoded data coupled thereto as signal (p) is separated into chroma component and luminance component, which are subjected to correction according to output signal (r) of the comparing section 12 to eliminate undesired phenomena to be described later and then mixed together to produce a signal (s) as an output. This signal (s) is subjected to D/A conversion in a D/A converter 15 to be sent out as analog television signal (t).

Now, the operation of rendering an NTSC signal of a first synchronization into a NTSC signal of a second synchronization in the system shown in FIG. 1 will be discussed. An NTSC signal has a subcarrier wave frequency of $f_S = 3.579546$ MHz, with 4/910 times that frequency set as horizontal scanning frequency and 2/525 times the horizontal scanning frequency as the vertical scanning frequency (i.e., frame frequency), so that the subcarrier frequency contained in one frame period is 119,437.5 cycles and is a fractional number.

From this ground, between two adjacent frames the phases of the subcarrier waves are opposite with respect to each other. This means that in the system for recording and reproducing an NTSC signal by using the one frame memory 7 as in the instant embodiment of the invention, odd and even frames are interchanged between recorded frame and reproduced frame.

In other words, although it is usual that a frame recorded as odd frame is reproduced as odd frame, it may be reproduced as an even frame due to a slight difference of the frame frequency between the recording and reproducing sides in the above system. This is illustrated in FIG. 2. On the left hand side of FIG. 2a, a signal recorded as indicated by solid line 203 is reproduced as a signal as indicated by one dot chain line 204. In this case, what is recorded as an even frame is reproduced as an even frame. On the right hand side of the Figure, a solid line 205 indicating what is recorded intersects with a one-dot chain line 206 indicating what is reproduced, that is, after the intersection the interchange of the reproduced frames occurs.

Namely, after the intersection a preceding frame portion recorded just prior to the record of frame 205 is reproduced in place of that indicated by the line 205. Thus through the intersection the interchange of reproduced frame is caused, and for example, an odd number frame replaces an even number frame, or vice versa. When the frame frequency difference is large, the crossing phenomenon occurs many times during unit period of time, and at each crossing interchange of frames takes place. However, in such case as when merely correcting phase difference of synchronizing signal within the same standard, this phenomenon occurs very rarely, in the order of once in several hours, because in this case very few standard subcarrier frequencies are involved. Consequently, the frame relation between recording and reproduction is normal or not so far off almost all period of time. Besides, since the period of interchange of frames is very short, the relation may be made either normal or not so by having resort to such means as blocking the recording at that moment. To discriminate this state a mere insertion of a flag pulse in an initial portion of the frame at the time of writing in the frame memory 7 is made, whereby it is possible to obtain information which is free from any undesired phenomenon that occurs at the time of frame interchange to be described later.

However, when compression of a frame is effected as shown in FIG. 3b, the speed of writing and that of reading greatly differ from each other with respect to the memory, so that the frequency of occurrence of crossing of one-dot chain line (reproduction) and solid line (recording) is greatly increased. FIGS. 4a and 4b show states where crossings take place, while FIG. 4c shows a state where no crossing takes place.

Therefore, it is difficult to avoid the instant of occurrence of crossing, thus posing the necessity of detecting the moment of occurrence of crossing and thereby positively avoiding the undesired phenomenon.

Figure 4:
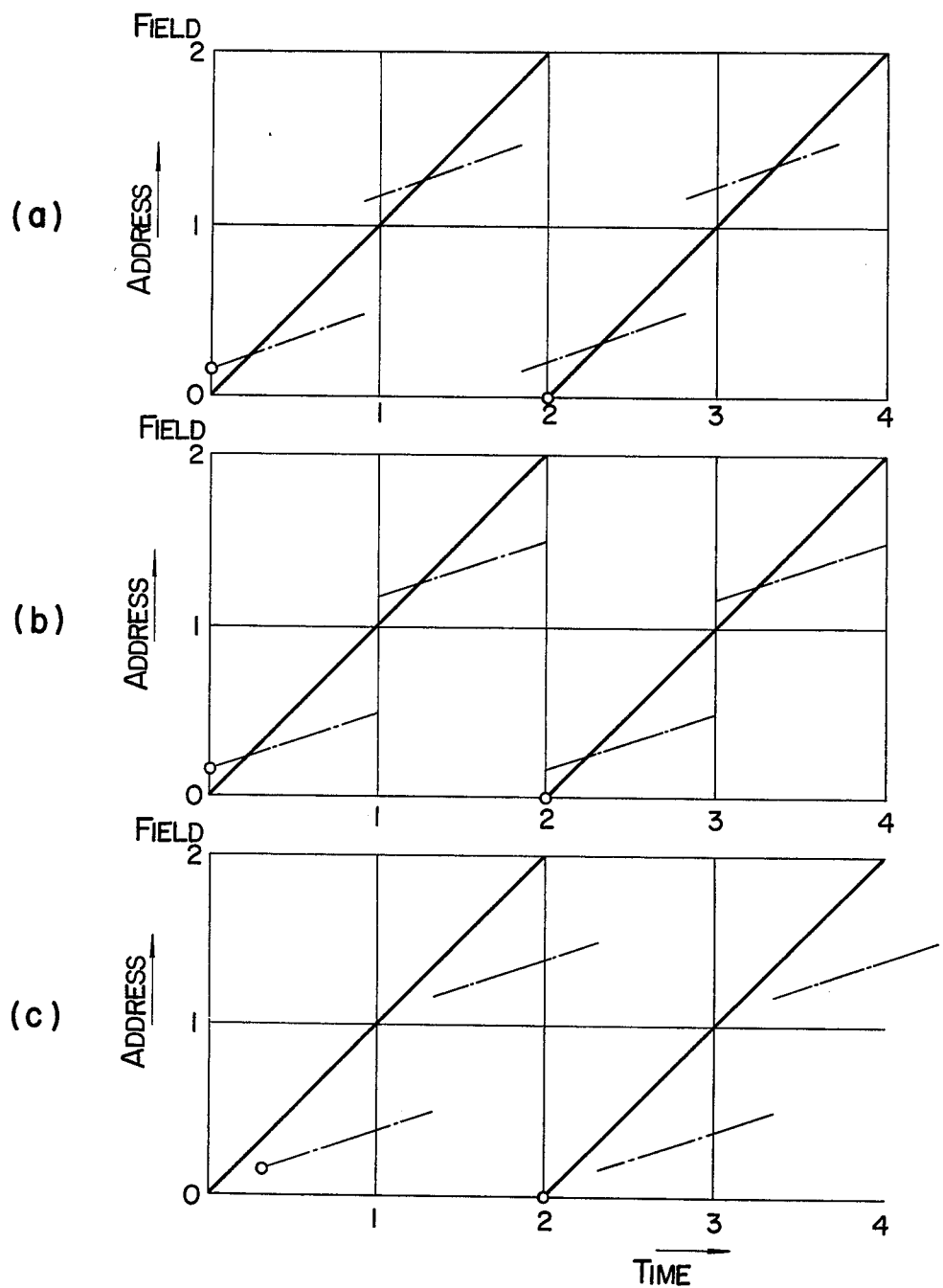

It is usual to use a frame memory of medium speed, and for high speed data recording and reproduction are alternately effected in parallel arrangement in suitable quantities to suit the cycle period of the memory. Thus, an enlargement of the moment of crossing shown in FIG. 4 is as shown in FIG. 5. Here, $t_1$ to $t_2$, $t_5$ to $t_6$, $t_9$ to $t_{10}$, $t_{13}$ to $t_{14}$, $t_{17}$ to $t_{18}$... are writing timings, and $t_2$ to $t_3$, $t_4$ to $t_5$, $t_6$ to $t_7$, $t_8$ to $t_9$, $t_{10}$ to $t_{11}$, $t_{12}$ to $t_{13}$, $t_{10}$ to $t_{15}$... are reading timings. In this Figure, the writing and reading are not alternately effected, but each writing state appear every two reading states. This is because of time interval between the intermittent samplings or extractions of data which are effected for every other bit in order to achieve the desired compression. As is apparent from the Figure, frames are interchanged between data reproduced by the read-out timings before and at $t_{10}$ to $t_{11}$ and data reproduced by the read-out timings at and after $t_{12}$ to $t_{13}$ (namely the first-mentioned data and the second-mentioned data are reproduced from the individual different frame information).

Accordingly, frame interchange of reproduced data can be determined very rationally by providing a memory for every unit of data to be written in and read out of the memory, so as to permit information to follow as to whether a frame of a television signal concerning the single synchronization is odd or even number frame when encoded data is recorded in and reproduced from the frame memory.

In the instant embodiment, the data is encoded into 8-bit codes and then subjected to parallel conversion such as to meet the cycle time of the memory (into 18-bit parallel data in the instant embodiment) for recording. Thus, the number of elements required for recording information as to whether the frame is odd or even is reduced (by the ratio of ⅛ × 1/18) which is small compared to the case of memory for picture data recording and is economical.

The afore-mentioned undesired phenomena occurring due to the frame interchange stem from the fact that in the NTSC signal two frames constitute a unit when considering the phase of the subcarrier wave, and there are two such phenomena occurring in dependence upon the phase relation of timing pulse operating the system.

(a) Firstly, in an arrangement such as to make the timing pulse phase synchronize with every horizontal synchronizing signal the subcarrier phase of the reproduced signal is inverted for each frame, so that chroma signals in adjacent reproduced frames are in complementary relation to each other.

(b) Secondly, in an arrangement such as to always have the timing pulses coincident in phase with the subcarrier wave, althrough the chroma signal is always normally reproduced, horizontal distortion of luminance signal results from the forward or backward shift of the leading edge of the horizontal sync signal by one half the subcarrier cycle period at every interchange.

Thus, serial data reproduced from the frame memory is separated into luminace component and chroma component, a memory for recording one-bit frame information for every data unit written in the frame memory is provided as frame information memory 9, and the output thereof is compared with frame information of the second synchronization signal to detect the occurrence of the interchange of reproduced frame and to effect a desired correction so that a normal signal can be obtained. The memory for recording an encoded first television signal data is not limited to that for one frame shown in the instant embodiment, and it is possible to make the memory of even one field or to increase its capacity by a unit of 0.5 frame to more than one frame, for instance 1.5 frames.

When carrying out this for the memory of one field, it can be inferred that information required to be recorded in a particular parallel memory represent whether each field and each frame is odd or even and that the quantity is doubled compared to the aforementioned case of one frame. With the use of such one field memory an additional abnormal phenomenon arises in interlacing scanning of horizontal scanning lines of the television signal controlled by the second synchronization due to interchange of odd and even fields. For correction of this, the address for reading out data from the aforementioned field memory may be corrected by comparing field information reproduced from the parallel memory and to which the first television signal belongs with the second synchronization.

The correction in the above-mentioned case (a) may be realized by controlling the polarity of chroma component by a detection signal resulting from the above comparison of the two synchronizations, while the correction in the case (b) may be realized by shifting the luminance component by one-half the subcarrier signal cycle period.

As has been described in the foregoing, in the instant embodiment the image compression is effected prior to recording of data in memory, but it is also possible to carry out compression at the time of reproducing previously recorded data. Further the frame interchange of the reproduced signal can also be detected from the comparison of the magnitude of address for recording data in memory and that of address for reproducing data from the memory.

We claim:

1. A phase control system for synchronizing unrelated video signals to reproduce a synchronized video signal comprising:
    means for producing a first timing signal from at least one signal component contained in an incoming video signal,
    means for digitally encoding said incoming video signal in accordance with said first timing signal,
    first memory means for recording said encoded video signal,
    second memory means for recording frame information or frame information and field information corresponding to said encoded video signal simultaneously with the recording of said encoded video signal in said first memory means,
    means for producing a second timing signal from at least one signal component contained in a second video signal,
    means for reading out said encoded video signal from said first memory means and said corresponding frame information or frame and field information from said second memory means under control of said second timing signal,
    means for providing frame or frame and field information associated with said second video signal,
    means for comparing the readout frame or frame and field information with frame or frame and field information associated with said second video signal and for determining whether a phase correction to said readout encoded video signal is required, and
    correcting means responsive to the output of said means for comparing for correction the phase of the readout encoded video signal.

2. The phase control system according to claim 1, wherein a flag pulse produced at the instant of the start of a frame is used as frame information to be written into said second memory means.

3. The phase control system according to claim 1, wherein said correcting means comprises means for controlling the polarity of the chroma component constituting said reproduced television signal in accordance with the output of said means for comparing.

4. The phase control system according to claim 1, wherein said correcting means comprises means for shifting the luminance component constituting said reproduced television signal by one-half the subcarrier signal cycle period.

5. The phase control means according to claim 1, which further comprises means for intermittently removing part of said encoded signal for conversion of an image size in said incoming video signal into a desired image size.

6. A phase control system comprising:
    means responsive to a signal component in an incoming television signal for producing a first clock pulse signal;
    means for sampling and encoding said television signal under control of said first clock pulse signal to produce encoded signal data,
    means coupled to the output of said sampling and encoding means for extracting components from said encoded signal data and compressing the thus extracted components to produce compressed data corresponding to a desired picture image size,
    first memory means for recording said compressed data under control of said first clock pulse signal,
    second memory means for recording frame information data relative to associated recorded compressed data,
    means responsive to a synchronizing signal for producing a second clock pulse signal,
    means for reading out compressed data and associated frame information data respectively from said first and second memory means under control of said second clock pulse signal, and means for controlling the phase of the readout compressed data in accordance with the associated readout frame information data.

7. A phase control system as in claim 6 wherein said means for controlling controls the phase of the chroma component of said readout compressed data.

8. A phase control system as in claim 6 wherein said means for controlling shifts the phase of the luminance component of said readout compressed data by one half cycle of the subcarrier period in accordance with said readout frame information data.

9. A phase control system for synchronizing unrelated video signals to reproduce a synchronized video signal comprising:
   means for producing a first timing signal from at least one signal component contained in an incoming video signal,
   means for digitally encoding said incoming video signal in accordance with said first timing signal,
   first memory means for recording said encoded video signal,
   means for producing a second timing signal from at least one signal component contained in a second video signal,
   means for reading out said encoded video data from said first memory means under control of said second timing signal,
   means for comparing the address of an encoded video signal recorded in said first memory with an address of a recorded encoded video signal readout from said first memory and for determining whether a phase correction of said readout encoded video data is required, and
   correcting means responsive to the output of said means for comparing for correcting the phase of the readout encoded video signal.

* * * * *

UNITED STATES PATENT AND TRADEMARK OFFICE
CERTIFICATE OF CORRECTION

PATENT NO. : 4,099,205
DATED : July 4, 1978
INVENTOR(S) : Hajime HATTORI, et al

It is certified that error appears in the above-identified patent and that said Letters Patent are hereby corrected as shown below:

Please change the date of the Foreign Application Priority date of Japanese Patent Application No. 129728 from October 27, 1976 to October 27, 1975.

Signed and Sealed this

Twentieth Day of March 1979

[SEAL]

Attest:

RUTH C. MASON
Attesting Officer

DONALD W. BANNER
Commissioner of Patents and Trademarks